Nov. 21, 1950 A. J. RACK 2,530,538

VERNIER PULSE CODE COMMUNICATION SYSTEM

Filed Dec. 18, 1948 2 Sheets-Sheet 1

INVENTOR
A. J. RACK
BY Harry C. Hart
ATTORNEY

VERNIER PULSE CODE COMMUNICATION SYSTEM

Filed Dec. 18, 1948 2 Sheets-Sheet 2

INVENTOR
A. J. RACK
BY Harry C. Hart
ATTORNEY

UNITED STATES PATENT OFFICE 2,530,538

VERNIER PULSE CODE COMMUNICATION SYSTEM

Alois J. Rack, Millington, N. J., assignor to Bell Telephone Laboratories, Incorporated, New York, N. Y., a corporation of New York Application December 18, 1948, Serial No. 66,119

10 Claims. (Cl. 178—43.5)

This invention relates to electrical communication, and particularly to communication by pulse techniques. Its general objects are to improve the fidelity and quality of a reproduced message.

While broadly applicable to communication systems generally, it is especially well adapted to pulse code transmission systems, and will be described as embodied in such a system.

In pulse code transmission, the amplitudes of a message wave to be transmitted are sampled at successive instants which are equally spaced in time. Each of these amplitude samples is then translated into a group of on-or-off pulses termed a code pulse group. A convenient code for this purpose is the 7-digit binary permutation code. Any binary permutation code is capable of representing $2^n$ discrete values where $n$ is the number of digits in the code. For example, with the 7-digit binary permutation code, $2^7$ or 128 different values can be represented. Thus each signal sample, which may have any amplitude of a continuous range from a preassigned negative maximum, through zero to a preassigned positive maximum is translated, in the 7-digit binary permutation code, into the nearest one of 128 different values. This process is termed "quantization," and its effect on the signal is known as "granularity" which, when the signal is reproduced, appears as background noise. Each different quantized value is translated into a unique code pulse group for transmission. At the receiver station the received signal in the form of successive code pulse groups is translated or "decoded" into successive quantized amplitude values out of which the message signal is reconstructed.

Pulse code transmission offers marked advantages over other forms because of the fact that substantially perfect regeneration can be carried out at the receiver station prior to decoding or at one or more repeater stations located between the transmitter station and the receiver station. Thus, when regeneration is employed, the only significant noise and distortion associated with the signal at the receiver are the noise and distortion which were contributed by the transmitter apparatus.

On the other hand, coding inherently involves quantization; and the quantization process possesses a certain disadvantage in that the granularity introduced by quantization of the signal at the transmitter is never removed in the decoding or translating process at the receiver but remains associated with the decoded signal as a background of noise.

It is a specific object of the invention to reduce the background granularity noise which is due to the quantization of the signal at the transmitter.

Clearly the granularity due to quantization of the signal can in theory be reduced to any desired minimum by indefinitely increasing the number of steps in the quantization process. In pulse code transmission, this means an indefinite increase in the number of digits of the code. As a practical matter, however, it is impossible to increase the number of digits in the code without increasing the size and complexity of the coding apparatus to fantastic proportions. Consider, by way of example, the pulse code transmission system described in the Bell System Technical Journal, vol. 27, pages 1 to 57, January, 1948. Briefly, the coder there described comprises a cathode beam tube having a collector anode toward which the cathode beam is projected and, interposed in the path of the beam, a coding mask comprising a plurality of apertures arranged in $n$ columns and $2^n$ rows, where $n$ is the number of digits in the code.

The tube is provided with vertical deflecting elements for deflecting the beam, under control of a signal sample to be coded, to a particular aperture row of which the apertures are arranged in accordance with the binary permutation code symbol which is most nearly representative of the signal sample, and with horizontal deflecting elements for sweeping the beam along this row, causing it to scan all of its apertures, and pass through them in turn and strike the anode, thus generating a code group of pulses in the anode circuit. In a specific example with which successful tests have been carried out, the number of digits is seven and the apertures are therefore arranged in seven columns and $2^7$ or 128 rows. Evidently, if the number of digits were increased to eight, the rows would be increased to $2^8$ or 256. For a given fineness of fabrication, this means substantially doubling the dimensions of the coding mask and therefore of the coder tube itself. Similarly, if the digits of the code were increased to 9, the aperture rows would number $2^9$ or 512, resulting in a corresponding fourfold increase in the size of the coder tube.

In one aspect, a specific object of the present invention is to secure the same results as would be obtainable by a great increase in the number of apertures in the coding mask without in fact making such an increase.

Using apparatus of this type, the quantization of the signal requires that the deflection of the cathode beam of the coder tube itself be quantized, that is, so stabilized at a particular deflection that the lateral sweep which it makes in the coding process takes place exclusively along a single aperture row, never crossing the division line between two adjacent rows. This quantization of the electron beam deflection itself presents a problem which has been solved by the use of a stabilizing grid and associated circuit as described in the aforementioned article in the Bell System Technical Journal, especially at pages 46 to 49. In brief, there is interposed in the path of the electron beam, between the electron gun and the apertured coding mask, a grid of parallel wires, each wire being aligned with a division between adjacent aperture rows of the coding mask. The beam can pass freely between two adjacent wires to scan the apertures of any particular row; but if, for any reason it should tend to deviate from this correct position, electrons of the beam strike one or other of the adjacent wires; i. e., the one above the aperture row being scanned or the one immediately below it. In either event, an electron current flows in an external circuit connected with these wires which is a measure of the deviation of the coding tube beam from its correct position. This current flows through an external resistor, and the voltage across this resistor is fed back to the beam-deflecting means in a sense to counteract the tendency of the beam to deviate from its prescribed position. The feedback is eliminated between successive coding sweeps of the beam, namely, during times when the beam is adopting a new deflection, corresponding to a new signal sample, either by defocussing the beam at these times, by adding a periodic deflection bias, or otherwise as desired.

This beam stabilizing system forms a part of the subject-matter of an application of L. A. Meacham Serial No. 776,211, filed August 5, 1947, issued June 21, 1949, as Patent 2,473,691.

It is a specific object of the present invention to produce an effective increase in the number of code digits of a pulse code transmission system without a corresponding increase in the size or complexity of the coding and stabilizing apparatus. One system for accomplishing this object is described in an application by Eugene Peterson, Serial No. 789,345, filed December 3, 1947, issued July 25, 1950, as Patent 2,516,587. In that system, the message signal is sampled, quantized and coded in the usual way, the resulting code pulse groups being transmitted to a receiver station where they are decoded for reproduction. In addition, however, the pulse code groups so obtained at the transmitter are locally decoded at the transmitter to provide an uncoded signal which is a replica of the original message signal except for the fact that its amplitude increases in steps instead of continuously; i. e., it has been quantized. This quantized signal is now balanced, sample by sample, against the original continuous signal to provide a granularity error signal. The latter is transmitted to the receiver station along with the principal code pulse groups. This transmission may be carried out in any convenient manner, by pulse transmission or otherwise, but it is of advantage to transmit it similarly to the main signal, that is by pulse code transmission. The error signal, therefore, is coded just as was the original message and the resulting code pulse groups are transmitted to the receiver over an auxiliary channel. There they are decoded to provide error signal samples which are then added, sample for sample, to the coded output of the principal decoder. As a result of this process the granularity and resulting background noise of the signal as finally reproduced are reduced. Because of the operation of the system as described in the foregoing paragraph, the system of the aforesaid application of Eugene Peterson has been termed a "vernier" transmission system.

It is a specific object of the present invention to accomplish the same results as those of the aforementioned application of Eugene Peterson without resort to the steps of locally decoding a coded signal at the transmitter station and balancing the result against the orignal signal or the apparatus required to carry out these steps.

In brief, the invention of the present application is based upon the recognition that the stabilizing signal which is derived from the stabilizing grid and fed back to the deflecting elements of the coder tube in the manner aforesaid itself measures the difference between the orignal signal and its quantized counterpart; in other words, it is itself a granularity error signal having the characteristics which render it suitable for use in a vernier system. In accordance with the invention, therefore, the signal which was originally generated for beam stabilizing purposes is put to use as a vernier system error signal, appropriate modifications in the associated circuit of the beam stabilizing system and of the vernier system being made to enable the current of the stabilizing grid to be so utilized as an error signal in a direct, simple and effective manner.

The invention will be fully apprehended from the following detailed description of a preferred embodiment thereof taken in connection with the appended drawings in which.

Figure 1:
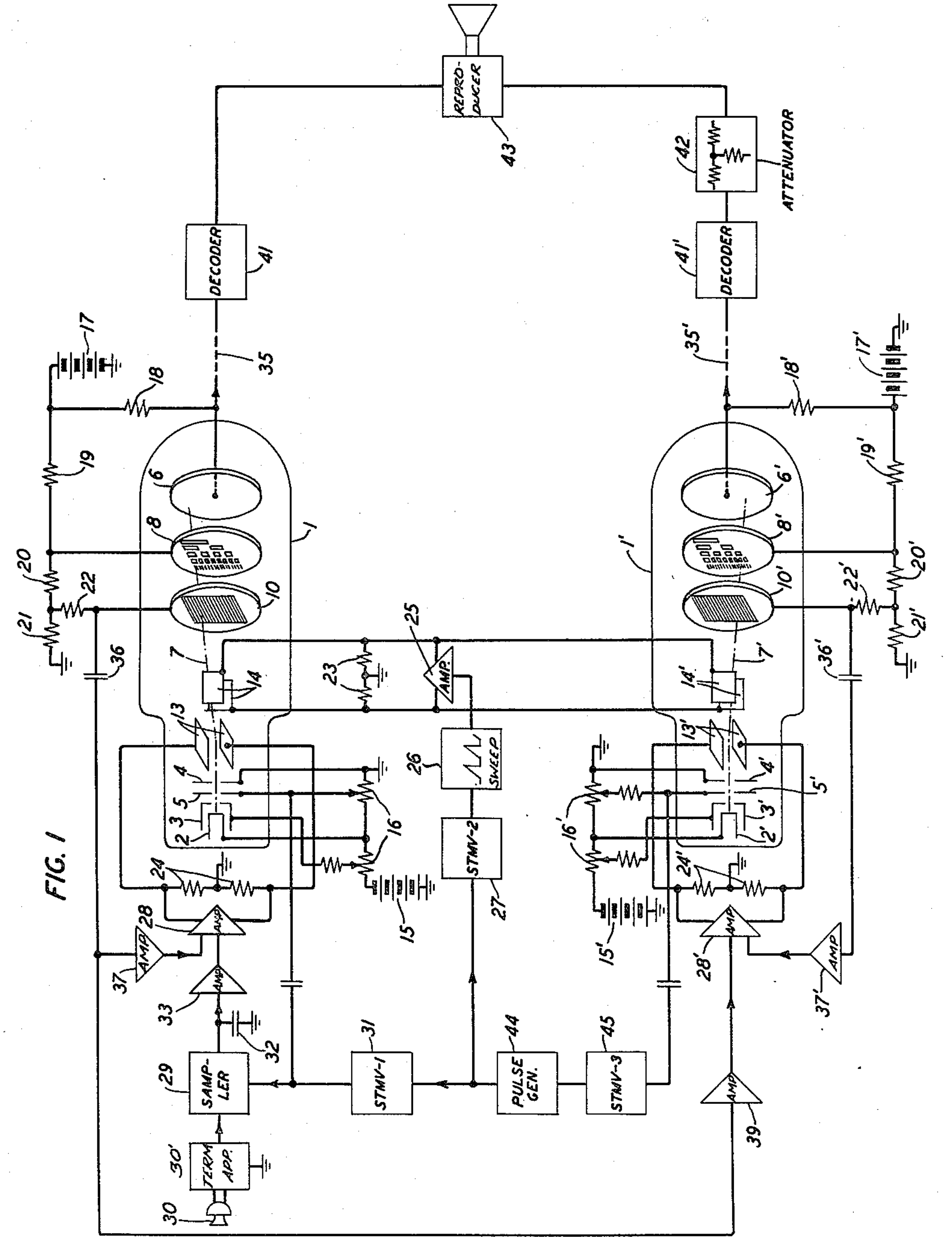
Fig. 1 is a schematic diagram of a vernier transmission system in accordance with the invention.

Referring now to the drawings, Fig. 1 is a schematic circuit diagram showing pulse code transmission apparatus suitable for carrying out the invention. The apparatus includes two cathode beam coder tubes 1, 1′ of the type described in the Bell System Technical Journal for January, 1948, pages 1 to 57. The function of the second tube (the lower one in the figure) is to compensate, in the sense of the present invention, for errors introduced by the first. Accordingly, description of the operation of this second tube will be postponed until after the description of the remainder of the system, and the manner in which the errors arise which are eliminated by the present invention, has been completed.

Figure 2:
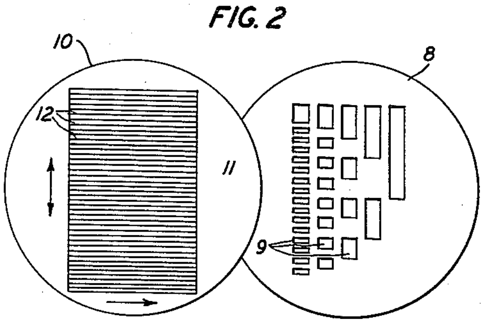
Fig. 2 is an end view of the coding mask and of the stabilizing grid of a coder tube, laterally displaced from each other, and suitable for use in carrying out the invention.

The tube 1 comprises an evacuated envelope having at one end thereof an electron gun for projecting a concentrated electron beam toward the other end of the envelope. The gun, which may be of conventional construction, comprises a cathode 2, a control electrode 3, an accelerating electrode 4, and a focussing electrode 5. Mounted within the envelope adjacent to the other end thereof is a collector anode 6 toward which the electron beam 7 is directed. A coding electrode or mask 8 is positioned in front of and parallel with the collector anode 6 and may be a circular metal plate having a number of parallel rows of apertures therein. An enlarged view is shown in Figure 2. The apertures 9 are arranged in $n$-columns and $2^n$ rows, where $n$ is the number of digits in the code. The number of aperture rows may be selected in accordance with practical considerations such as the required fidelity of signal translation, the amount of "granularity" which may be tolerated, the available frequency bandwidth of the transmission channel, the required signalling speed, and the like. In a specific example with which successful tests have been carried out, the number of digits is seven and the apertures are therefore arranged in seven columns and $2^7$ or 128 rows. In this specification, however, to avoid complexity of description, and to simplify the drawings, the coding mask is envisaged as having 32 parallel rows, each of five virtual apertures. (By the term "virtual aperture" is means a location, measured along the row, in which there is or is not an aperture.) In the top row all five of the virtual apertures are real apertures. In the second row the first virtual aperture is a blank and the remaining four are real. In the third row the second virtual aperture is a blank, whereas the first, third, fourth and fifth are real. In the fourth row, the first two virtual apertures are blanks, the third, fourth and fifth being real, etc. The several rows constitute a five digit coding system adapted to translate signals into 32 different code pulse groups.

To prevent the clipping of exceptionally large signal peaks, the real apertures of the top row and the virtual apertures of the bottom row greatly exceed in size the apertures, real or virtual, of all other rows. This feature forms a part of the subject-matter of an application of W. M. Goodall, Serial No. 37,035, filed July 30, 1948.

Nothing is gained by providing a septum between real apertures of the same column in adjacent rows. Therefore it is customary, in manufacture, to merge such apertures. Thus, for example, in the fifth column, the last apertures of the first sixteen rows all merge to form one large rectangular hole.

A stabilizing grid electrode 10 is mounted adjacent to the face of the coding mask 8 toward the electron gun and parallel with it, and comprises a foundation member or plate 11 having therein a rectangular aperture aligned with the coding mask 8 and of such dimensions as to expose the entire rectangular area containing any and all of the apertures 9 of the mask 8 to the electron beam 7. This mounting plate 11 bears a number of conducting grid wires 12 which run parallel with the aperture rows of the coding mask 8 and define 32 parallel openings, each of which is opposite to a corresponding row of virtual apertures of the coding mask 8. In this connection the term "opposite" is intended to denote alignment from the standpoint of the electron beam 7 which originates at the electron gun rather than from the standpoint of an observer at infinity. Thus, due to the fact that the path of the beam 7 to the coding mask 8 is slightly longer than the path to the stabilizing grid 10, the spacing between the grid wires 12 is preferably slightly less than the spacing between the aperture rows of the mask 8.

Two pairs of deflecting electrodes mounted at right angles to each other and hereinafter denoted, for the sake of definiteness only, as the "vertical deflecting electrodes" 13 and the "horizontal deflecting electrodes" 14, are mounted adjacent to the electron gun, the vertical deflecting electrodes being placed parallel with the grid wires 12 of the stabilizing grid 10.

As shown in Fig. 1, the electrodes constituting the electron gun are maintained at appropriate relative potentials by a battery 15 and a potentiometer 16. The collector anode 6 is held at a positive operating potential by a battery 17 and is connected thereto through an output resistor 18. The coding mask 8 may be held at a potential slightly less positive than the collector anode 6 differing therefrom by the potential drop across a resistor 19. The stabilizing grid 10 may similarly be held at a potential slightly less positive again, by reason of the drop across another resistor 20. It is connected to the potentiometer 20, 21 by way of a resistor 22 of high ohmic value, i. e. a megohm or more The horizontal deflector plates 14 are balanced to ground by way of a resistor 23 with a grounded center tap, and the vertical deflector plates 13 are similarly balanced to ground by way of a resistor 24 with a grounded center tap. The horizontal deflector plates 14 are actuated by way of a balanced amplifier 25 by the application of a sweep voltage thereto, derived from a sawtooth sweep generator 26 which is controlled as to timing by a single trip multivibrator 27. The vertical deflector plates 13 are actuated by a balanced amplifier 28 which is energized in part by signal samples derived from a sampler 29 and in part by a feedback current from the stabilizing grid 10.

In the operation of the system a message to be transmitted which may originate, for example, at a telephone transmitter 30, is repeatedly sampled by a sampling circuit 29 of suitable type controlled as to timing by the output of a single trip multivibrator 31, whose timing pulse is in turn controlled by a basic timing generator 44. Each sample, after being taken, is stored on a condenser 32 until the arrival of a new sample. Each of the samples is representative of the amplitude of the wave being sampled at the instant at which the sampling pulse terminates. The resulting wave, which comprises a sequence of substantially steady signals, each of which changes rapidly to the next at the start of the next sampling pulse, is applied, through an isolating amplifier 33, to the vertical deflecting amplifier 28 and thence to the vertical deflecting plates 13 of the cathode beam tube 1.

For each sample, the electron beam 7 is thus moved by vertical deflection to a particular row of apertures 9 of the coding mask 8, i. e., to a code position corresponding to the amplitude of the sample. Then the beam, having been thus located at the proper height on the mask 8 and adjacent one end of the correct aperture row, is swept along this row and successively over each of its apertures. The sweep is carried out by application of the sawtooth voltage of the sweep generator 26 to the horizontal deflection plates 14 of the coder tube 1. The start and termination of the sweep are controlled by the single trip multivibrator 27 whose timing is controlled by the sample-timing pulse generator 44. As the beam 7 passes over each aperture 9 of the coding mask 8, beam electrons pass through this aperture, strike the collector anode 6, and so generate a current pulse in the output circuit of the coding tube. Thereby a code pulse group is generated which is uniquely related to the height along the coding mask 8 to which the beam 7 was deflected, and therefore, to within the quantization error, to the signal sample which caused this deflection. The code pulse group is then transmitted over a suitable transmission path 35. Before transmission, the code pulse groups may be regenerated as desired, and transmission may be carried out by wire, or by radio, or by any desired means, such apparatus not being a part of the present invention.

Each code pulse group represents the corresponding sample only to the nearest one of a restricted number of discrete values; for example, with the seven digit code, to the nearest one of 128 different discrete values. Thus it is "quantized." This quantization possesses a certain disadvantage in that the granularity introduced by the quantization process is never removed in the decoding or translating process at the receiver but remains associated with the decoded signal as a background of noise. This quantization noise may, in theory, be reduced to any desired minimum by indefinitely increasing the number of steps in the quantization process. One obvious way to increase the number of steps is to increase the number of digits in the code by increasing the number of columns and rows of apertures in the coding mask 8. For example, if the number of digits were increased from 7 to 8, the number of rows would be increased to $2^8$ or 256. For a given fineness of fabrication, this means substantially doubling the dimensions of the coding mask and therefore of the coder tube itself. Similarly, introduction of each additional code digit necessitates doubling the size of the coding mask and hence of the coding tube. It is an object of this invention to secure the same results as would be obtainable by a large increase in the number of coding mask apertures, and hence the size of the coding tube, without in fact making such an increase.

The process of transforming each signal sample into a code pulse group is described in the articles in the Bell System Technical Journal heretofore identified, so that detailed explanation of such operation is deemed unnecessary here. However, certain features of the coding operation being pertinent to this invention may be mentioned in this application.

As has been pointed out heretofore, the opening between each pair of adjacent grid wires 12 of the stabilizing electrode 10 corresponds to a particular code position and code pulse group. In order that correct coding may be obtained, it is necessary that the beam 7 commence each sweep between the proper two grid wires and remain there throughout the sweep. Any tendency of the beam to deviate from its correct path results in electrons striking one or the other of these path-defining wires. This gives rise to a current which is fed back, by way of a condenser 36, and an isolating amplifier 37 to the vertical deflecting amplifier 28 and thus to the vertical deflecting plates 13 of the cathode beam tube 1 in a sense to counteract the deviation. Thus the stabilizing grid 10 tends to coerce the beam 7 to continue its sweep along the particular aperture row at which the sweep started. Furthermore, since the stabilizing grid 10 restricts the beam to a finite number of discrete paths, equal in number to the spaces between the grid wires, it operates to quantize the beam deflection in the direction perpendicular to the aperture rows.

A further increase in the margin of stability of the quantized beam position is obtained by defocussing the beam while the signal sample is changing from one value to another. This operation forms a part of the subject-matter of the aforementioned application of L. A. Meacham, Serial No. 766,211, filed August 5, 1947, now Patent 2,473,691. For the purpose of the present application it is deemed sufficient to note that the beam is defocussed while the signal sample is changing in value. Thus the feedback from each grid wire 12 is masked by that from all the others, so that the beam-stabilizing function of this feedback is eliminated. Thus the position of the beam changes almost linearly with the signal sample. This insures that the beam shall attain the correct position, as determined by the signal sample, smoothly and rapidly and not, as might otherwise happen, be locked into a false position by feedback from the quantizing grid 10. The defocussing and refocussing are effected by applying pulses of the multivibrator 31 to the focussing electrode 5.

Figure 3:
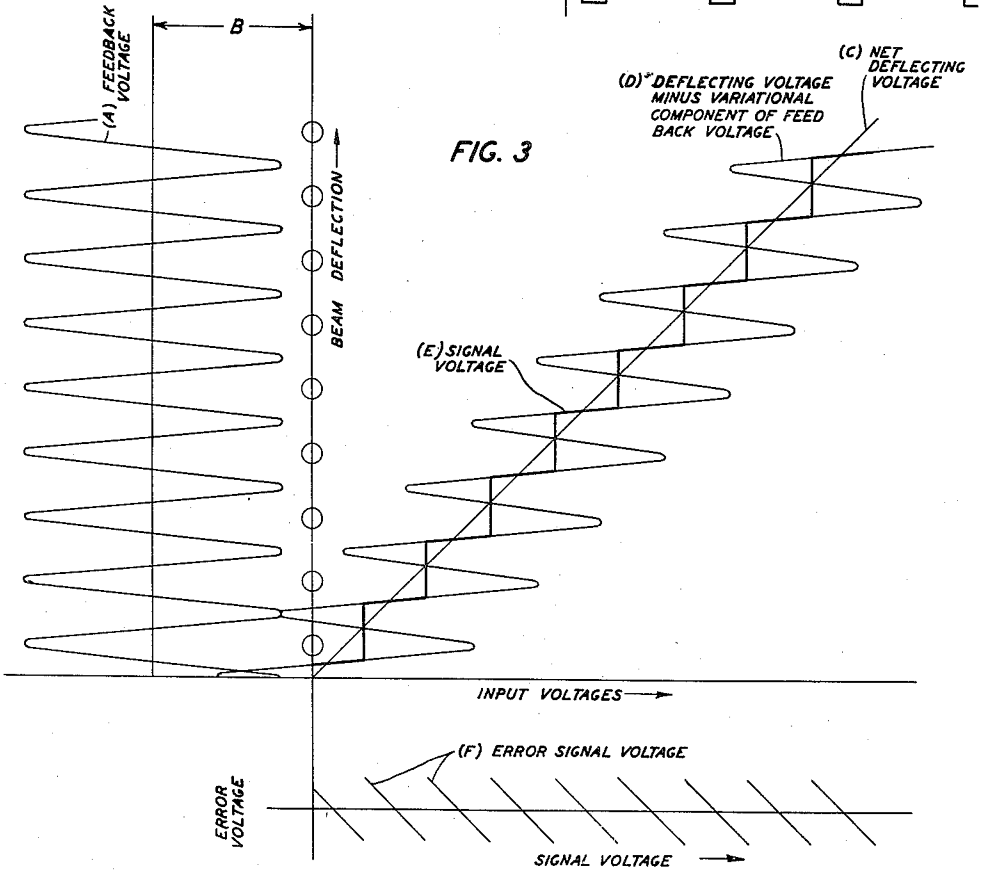
Fig. 3 is a group of curves of assistance in explaining the operation of the invention.

The principles and relationships involved in the operation of the stabilizing grid 10 as pertaining to the present invention are illustrated in Fig. 3. If the beam were to move over the wires 12 of the stabilizing grid 10, i. e., if it were deflected across the wires in a direction perpendicular to the normal sweep direction, current to the stabilizing grid would vary cyclically in the manner indicated by the curve A of Fig. 3, being a maximum when the beam is centered on any single grid wire and a minimum when the beam is midway between two adjacent grid wires. This current consists of a steady or average component B, feedback of which to the deflecting amplifier 28 is blocked by the condenser 36, and a variational component which varies about that steady value and is fed back. The relation between beam position and deflecting voltage, i. e., voltage across the deflector plates 13, is the linear one of line C. Thus for any beam position the total deflecting potential between the vertical deflector plates 13 must fall on line C. This potential comprises two components, namely, the voltage due to the signal, and the variational component of the feedback voltage A. With the beam defocussed to allow it to adopt a new position corresponding to a new signal sample, the feedback voltage is effectively wiped out, and the line C then gives the relation between input signal and resulting virtual beam deflection. But with the beam focussed, as for sweeping along a row of coding mask apertures, the feedback voltage is effective, so that the relation between signal voltage and beam deflection is given by the difference between the cyclic curve A and the line B; i. e., by the curve D. But, as is fully explained in the aforementioned application of L. A. Meacham, positively sloping parts of this curve are exceedingly stable, negatively sloping parts being unstable, so that the beam position, and hence the deflecting voltage, are restricted to the positively sloping parts of the curve. The defocussing of the beam between sweeps causes the beam, when focussed, to adopt the most nearly correct quantized level. This is represented graphically by restricting operation to the central portion of each positively sloping part of the curve D, i. e., to the stair-step curve E. The departure from linearity of this line is proportional to the feedback voltage from the stabilizing grid 10, and represents the difference between the nearest quantized level and the signal potential. The feedback voltage, then, is in effect a signal which is proportional to the difference between the signal sample and its associated quantized level; i. e., it is proportional to the quantization error, and is plotted as an error voltage, against signal voltuage, in curve F. In accordance with the present invention this feedback voltage is utilized as a granularity error signal and is transmitted to the receiver station along with the principal code pulse groups, and preferably by the same kind of transmission. Accordingly, as shown in Fig. 1, the feedback voltage, hereafter referred to as an "error signal," is first adjusted in magnitude by a scaling amplifier 39 and is then applied to the vertical deflecting amplifier 28' and thus to the vertical deflecting plates 13' of a second cathode beam coder tube 1' of the same type as the tube 1 employed for coding the original signal sample. The component parts of this second tube are designated by the same reference characters as those of the main tube 1, distinguished by primes. The horizontal deflecting electrodes of both cathode beam tubes are actuated by the same sweep generator 26. Thus for each original signal sample there is a corresponding error signal and for each code pulse group corresponding to an original signal sample there is a code pulse group corresponding to its error signal. The sequence of error code pulse groups is delivered to the receiver station by an auxiliary transmission channel 35'. As before, suitable regeneration, amplification, modulation, and transmission apparatus, forming no part of the present invention are omitted from the drawing, but may be included in the system as desired.

At the receiver, the code pulse groups of the main channel 35, after demodulation, regeneration, and amplification as required, are applied to a decoder 41. Its output is in the form of quantized main signal samples. At the same time the code pulse groups of the auxiliary channel 35' are decoded by an auxiliary decoder 41' whose output is likewise in the form of quantized error signal samples. The quantized error signal samples are then attenuated by an attenuator 42 to reduce their values by the correct amount, namely by the amount of amplification by the sealing amplifier 39 at the transmitter station.

The output of the attenuator 42 is now in the form of a sequence of minutely quantized small signals which afford correction to compensate for the quantization of the main channel signals. The main channel signals and auxiliary channel signals are now added by feeding them together to a reproducer 43 which delivers a message which is a substantial replica of the original message at the transmitter.

The two decoders 41, 41' at the receiver should be alike in performance and are preferably alike in structure. They are to be operated at the pulse group frequency and maintained in the correct phase to collect all of the pulses of a single code pulse group and translate them and only them into an output amplitude. Synchronization of the decoders at the receiver with the transmitter apparatus may be carried out by signals transmitted over an auxiliary pilot channel, by marker pulses interlaced with the code pulse group either of the main channel or of the error signal, or in any desired manner.

It is inherent in the nature of the quantization process that the maximum value of the granularity error signal be one-half step, positive or negative. This maximum value occurs when the signal sample amplitude lies midway between two adjacent steps. Lesser granularity errors occur when the signal sample amplitude lies less than one-half step from the nearest quantized value. This is true no matter what may be the total number of available steps. For example, with the 128 steps of a seven digit code, a positive sample of maximum amplitude deflects the coder tube beam to its full extent in the upward direction, which is 64 steps removed from the center of the coding mask, the zero signal position. If, now, the granularity error signal be built up before coding by scaling amplification by a factor, 128, the maximum range of granularity error signals will produce deflections to the full extent of the code mask and these in turn will be broken down by the process of the invention into 128 different quantized values. At the receiver, the error signals in the auxiliary channel may be attenuated by the same factor, 128, the magnitude of each step being correspondingly reduced. As a result the granularity of the signal as a whole has been reduced by a factor $2^7$ and the background noise is at the level which would obtain with straight-forward single path transmission using 14 digits instead of 7. Hence the process carried out as described above has been termed a "vernier" process.

The above holds when the quantization process itself is free from errors. It may happen, however, that the original deflection of the coder beam is in error, for example, by the width of one aperture row caused perhaps by a defective grid wire of the stabilizing grid 10. In this event the difference between the original signal sample and the quantized value, and hence the feedback voltage or error signal, is one and one-half steps. If this error signal were to be amplified by a factor 128, the cathode beam 7' of the auxiliary coder tube 1' would be deflected well beyond the last aperture row of the mask 8'.

To guard against this possibility it is preferred to adjust the gain of the scaling amplifier 39 to amplify the error signal by a factor 30–40, and to attenuate the corresponding decoded error signal samples at the receiver by the same amount. Thus if the amplification factor at the transmitter were 32, the maximum granularity error would deflect the beam one quarter of the distance to the upper or lower end of the mask 8' while the combined effect of this granularity error plus a one step quantization error would cause a deflection of three quarters of the distance to the same end point. In effect this is equivalent to sacrificing one or two digits of the possible seven of the error pulse code in order to correct for quantization errors as distinct from granularity errors.

Figure 4:
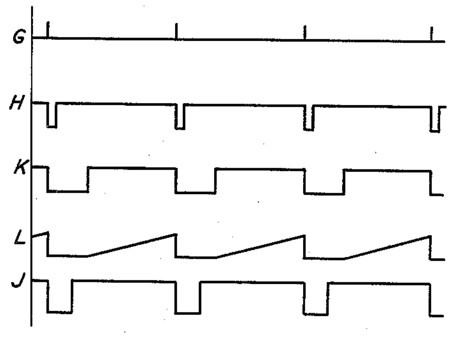
Fig. 4 is a group of wave form diagrams of assistance in explaining the operation of the invention.

The sequence of events in time may now be reviewed with reference to Fig. 4, in which curve G represents a sequence of sharp pulses, which occur at definite intervals, derived from the pulse generator 44 which may be of known construction. Curve H represents the output of the single trip multivibrator 31 which delivers square pulses each of which commences upon the arrival of one of the sharp pulses from the pulse generator 44 and endures for a preassigned time determined by the parameters of the circuit. These square pulses serve to control the sampling circuit 29 which samples the signal to be translated. These same pulses (curve H) are also applied to the focussing electrode 5 of the main coder tube 1 thus defocussing the beam while the signal sample is changing from one value to another.

While the electron beam is defocussed, its trace on the quantizing grid extends over a number of grid wires and therefore over a number of spaces between. Inasmuch as the potential on the control grid of the tube has not altered, the total beam current remains unchanged, and as the cross-section of the beam is expanded its electron density is reduced in proportion. Therefore the cyclic value of the feedback current or voltage is greatly reduced. Hence, for the duration of the defocussing operation the feedback voltage is not the true error signal but changes to the true error signal when the beam is focussed again. This feedback voltage is applied, after amplification by the scaling amplifier 39, to the deflecting amplifier 28' of the error coding tube 1'. To assure that the beam 7' of the error coding tube 1' shall smoothly and rapidly attain its correct position as determined by the true error signal, the beam 7' must be defocussed while the error signal is changing to its true value, namely, at the termination of the defocussing pulse of the main coder tube 1. A convenient method of obtaining such a defocussing pulse is to control another single trip multivibrator 45 by the pulse generator 44. This multivibrator 45 delivers negative pulses (line J of Fig. 4) of the same frequency as those of line H but of longer duration. These are applied to the focussing electrode 5' of the error coding tube 1'.

Still another single trip multivibrator 27 is controlled by the pulse generator. This multivibrator delivers negative pulses (line K) at the same frequency as those of the first two multivibrators 31, 45, but again of longer duration. These pulses control the sawtooth wave generator 26 whose output increases steadily with time as long as the pulses of the third multivibrator 27 have positive values, falling to zero and remaining there as long as the pulses have negative values. These sawtooth waves (line L) are applied as shown in Fig. 1, to the horizontal deflecting plates 14, 14' of both coder tubes 1, 1', thereby sweeping the beams of both tubes across their respective coding masks 8, 8' and producing code pulse groups for both main signal sample and error signal sample at the same time. The pause between each sawtooth deflection voltage and the next one, corresponding in duration to the negative pulses (K) of the third multivibrator 27, permits the vertical deflection amplifier of each coder tube to receive a main signal sample or an error signal sample as the case may be and to furnish the necessary deflection to the virtual beam to place it in the correct coding position. This pause also permits the beam to be refocussed and allows for a necessary short interval in which the beam moves from its unquantized to its quantized position.

The two code pulse groups, main and error, having thus been produced at the same time, may be transmitted by way of their respective transmission paths 35, 35' to the receiver station, decoded simultaneously and added together without the necessity of introducing time delay in either path.

Many modifications of the foregoing system will be apparent to one skilled in the art. For example, after having produced the main and error code pulse groups, they may be interlaced on a time division basis, thus utilizing only one transmission path between transmitter and receiver. In another modification the error signal may be interlaced with the main signal samples thus utilizing only one beam coder tube and one transmission path between transmitter and receiver. This economy of either coder tube or transmission path or both places a further requirement on the receiving station. Each main signal sample and its associated error signal must be arranged in time coincidence before they are added together. Decoding may be performed on a time division basis by one decoder or the code pulse groups may be separated and routed to their individual decoders as desired.

What is claimed is:

1. Signal translating apparatus which comprises an electron discharge device having means for projecting a focussed beam of electrons, means for deflecting said beam, a stabilizing electrode in the path of said beam, comprising a plurality of substantially similar elements narrowly spaced from one another and defining a plurality of similar passages for the beam between them, a source of an original signal to be transmitted, connections for applying the potential of said signal to said deflecting means, connections for feeding back to said deflecting means the potential of a current flowing by way of said beam to any of said elements, said apparatus giving rise to a net beam deflection potential which is a quantized counterpart of the original signal and to a feedback potential of said current which comprises an error signal which is representative of the difference between said original signal and its quantized counterpart, means for converting said quantized counterpart into a first transmission signal, and means for converting said error signal into a second transmission signal.

2. Signal translating apparatus which comprises an electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, connections for applying the potential of said signal to said deflecting means, connections for feeding back to said deflecting means the potential of a current flowing by way of said beam to any of said elements, said apparatus giving rise to a net beam deflection potential which is a quantized counterpart of the original signal and to a feedback potential of said current which comprises an error signal which is representative of the difference between said original signal and its quantized counterpart, coding apparatus for translating successive values of said quantized counterpart into a first sequence of permutation code pulse groups, and coding apparatus for translating successive values of said error signal into a second sequence of permutation code pulse groups.

3. Signal translating apparatus which comprises an electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, means for periodically sampling said signal to provide a sequence of signal amplitude samples, connections for applying the potential of each of said samples to said deflecting means, connections for feeding back to said deflecting means the potential of a current flowing by way of said beam to any of said elements, said apparatus giving rise to a net beam deflection potential which is a quantized counterpart of the original signal sample and to a feedback potential of said current which comprises an error signal which is representative of the difference between said original signal sample and its quantized counterpart, means for converting said quantized counterpart into a first transmission signal, means for converting said error signal into a second transmission signal, means for defocussing said beam during transitions from each original signal sample to the following original signal sample, and for thereupon refocussing said beam, and means for delaying the conversion of the error signal into a transmission signal until after the refocussing of said beam has been completed.

4. Signal translating apparatus which comprises an electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, connections for applying the potential of said signal to said deflecting means, connections for feeding back to said deflecting means the potential of a current flowing by way of said beam to any of said elements, said apparatus giving rise to a net beam deflection potential which is a quantized counterpart of the original signal and to a feedback potential of said current which comprises an error signal which is representative of the difference between said original signal and its quantized counterpart, means for converting said quantized counterpart into a first transmission signal of recognizable granularity, means for converting said error signal into a second transmission signal, means for transmitting both of said signals to a receiver station and, at said receiver station, means for combining said signals as received into a single signal of reduced granularity.

5. Signal translating apparatus which comprises a first electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, connections for applying the signal of said source to said deflecting means, connections for feeding back to said deflecting means a current flowing by way of said beam from said beam projecting means to any of said elements, said apparatus giving rise to a beam deflection which is a quantized counterpart of the original signal and to a feedback current which is representative of the quantization error, means for converting said quantized counterpart into a primary signal of recognizable granularity, and means for utilizing said feedback current to reduce said granularity.

6. Signal translating apparatus which comprises a first electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, connections for applying said signal to said deflecting means, connections for feeding back to said deflecting means a current flowing by way of said beam from said beam-projecting means to any of said elements, said first device having a beam deflection which is a quantized counterpart of the original signal and a feedback current which is representative of the quantization error, means for converting said quantized counterpart into a transmission signal of recognizable granularity, a second similar discharge device having similar beam projecting and beam deflecting means and a similar beam-stabilizing electrode, connections for applying the voltage of said first-named feedback current to the deflecting elements of the second discharge device, connections for feeding back to the deflecting means of the second device a current flowing by way of the beam from the second beam-deflecting means to any of the elements of the second stabilizing electrode, said second device having a beam deflection which is a quantized counterpart of the quantization error of the first device, means for converting said second quantized counterpart into a second transmission signal, means for transmitting said first and second transmission signals to a receiver station and, at said receiver station, means for combining said first and second signals to form a reproducible signal of reduced granularity.

7. Signal translating apparatus which comprises a first electron discharge device having means for projecting a focussed beam of electrons, means for deflecting said beam, a stabilizing electrode in the path of said beam, comprising a plurality of substantially similar elements narrowly spaced from one another and defining a plurality of similar passages between them, a source of an original signal to be transmitted, connections for applying said signal to said deflecting means, connections for feeding back to said deflecting means a current flowing by way of said beam from said beam projecting means to any of said elements, said first device having a beam deflection which is a quantized counterpart of the original signal and a feedback current which is representative of the quantization error, means for converting said quantized counterpart into a transmission signal of recognizable granularity, a second similar discharge device having similar beam-projecting and beam-deflecting means, connections for applying the voltage of said first-named feedback current to the deflecting elements of the second discharge device, means for converting the beam deflection of said second device into a second transmission signal, means for transmitting said first and second transmission signals to a receiver station and, at said receiver station, means for combining said first and second signals to form a reproducible signal of reduced granularity.

8. Signal translating apparatus which comprises a first electron discharge device having means for projecting a focussed beam of electrons, a coding mask having a plurality of rows of apertures disposed to pass electrons of said beam, an anode disposed to receive electrons passed by said apertures, a source of an original signal to be transmitted, means for deflecting said beam in a direction normal to the aperture rows under control of said signal to impinge on said mask at a location proportional to said signal, means for thereupon sweeping said beam in a direction parallel with said rows, means interposed in the paths of said beam for so modifying the signal-controlled beam deflection that the beam is deflected precisely to that one particular aperture row whose location on the mask is most nearly proportional to the signal, the sweep of the beam taking place along said row and giving rise, by passage of the beam electrons through the apertures of that row in succession, to a code group of pulses on the anode, which is representative of the original signal but for granularity introduced by the coding mask, means for deriving from said deflection-modifying means an auxiliary signal which is related to the deflection modification, a second similar discharge device having similar beam-projecting and beam-deflecting means and a similar coding mask and collecting anode, conections for applying said auxiliary signal to the deflecting elements of said second device to deflect the second beam to a location on the second mask which is related to said auxiliary signal, means for sweeping the second beam over the second mask in a direction parallel with the aperture rows of the second mask after the second beam deflection has become stable, to give rise, by passage of the electrons of the second beam through the apertures of a row of the second mask in succession, to a code group of pulses on the second anode which is representative of the granularity error contained in the first code pulse group, and means for utilizing said second code pulse group to offset the granularity errors of the first code pulse group.

9. Signal translating apparatus which comprises a first electron discharge device having means for projecting a focussed beam of electrons, a coding mask having a plurality of rows of apertures disposed to pass electrons of said beam, an anode disposed to receive electrons passed by said apertures, a source of an original signal to be transmitted, means for deflecting said beam in a direction normal to the aperture rows under control of said signal to impinge on said mask at a location proportional to said signal, means for thereupon sweeping said beam in a direction parallel with said rows, means interposed in the path of said beam for so modifying the signal-controlled beam deflection that the beam is deflected precisely to that one particular aperture row whose location on the mask is most nearly proportional to the signal, the sweep of the beam taking place along said row and giving rise, by passage of the beam electrons through the apertures of that row in succession, to a code group of pulses on the anode, which is representative of the original signal but for granularity introduced by the coding mask, means for deriving from said deflection-modifying means an auxiliary signal which is related to the deflection modification, and means for utilizing said auxiliary signal to reduce said granularity.

10. Pulse code transmission apparatus which comprises a pair of similar electron discharge devices each comprising a member having a plurality of rows of apertures therein, means opposite to said member for projecting an electron beam toward said member, means for deflecting said beam in the direction along one of said rows, elements for deflecting said beam in a direction normal to said first direction, and means for guiding said beam along a selected one of said aperture rows while it is deflected by said deflecting elements, said guiding means comprising an auxiliary electrode disposed between said beam projecting means and said apertured member and having therein apertures conforming to the aperture rows of said member, a feedback coupling between said auxiliary electrode and said deflecting elements and a target located beyond said first-named apertured member, a source of an original signal to be transmitted, connections for applying the potential of said source to the deflecting elements of one of said devices, an amplifier having input terminals and output terminals, connections for applying the feedback signal of said first device to said input terminals, and a coupling from the output terminals of the amplifier to the input terminals of the second device.

ALOIS J. RACK.

REFERENCES CITED

The following references are of record in the file of this patent:

UNITED STATES PATENTS

| Number | Name | Date |
|---|---|---|
| 2,297,752 | Du Mont | Oct. 6, 1942 |
| 2,458,652 | Sears | Jan. 11, 1949 |

FOREIGN PATENTS

| Number | Country | Date |
|---|---|---|
| 315,362 | Great Britain | July 24, 1929 |